(12) United States Patent
Takagi

(10) Patent No.: US 11,983,319 B2
(45) Date of Patent: May 14, 2024

(54) OPTICAL APPARATUS, IMAGE PICKUP APPARATUS, CONTROL METHOD OF OPTICAL APPARATUS, AND STORAGE MEDIUM

(71) Applicant: CANON KABUSHIKI KAISHA, Tokyo (JP)

(72) Inventor: Shin Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/156,480

(22) Filed: Jan. 19, 2023

(65) Prior Publication Data
US 2023/0236666 A1    Jul. 27, 2023

(30) Foreign Application Priority Data
Jan. 25, 2022   (JP) .................................. 2022-009747

(51) Int. Cl.
| G09G 5/00 | (2006.01) |
| G06F 3/01 | (2006.01) |
| G02B 27/00 | (2006.01) |
| G02B 27/01 | (2006.01) |

(52) U.S. Cl.
CPC .......... *G06F 3/013* (2013.01); *G02B 27/0093* (2013.01); *G02B 2027/011* (2013.01); *G02B 2027/0187* (2013.01); *G02B 27/0189* (2013.01)

(58) Field of Classification Search
CPC ........ G06F 3/013; G06F 3/012; G06F 3/0304; G02B 27/0189; G02B 27/0093; G02B 27/0172; G02B 2027/0147; G02B 2027/011; G02B 2027/0187
USPC ........................................................ 345/156
See application file for complete search history.

(56) References Cited

U.S. PATENT DOCUMENTS

| 2015/0130714 A1* | 5/2015 | Onuki ..................... G06F 3/011 |
| | | 345/157 |
| 2017/0329400 A1* | 11/2017 | Noda ...................... G06F 3/013 |
| 2017/0344112 A1* | 11/2017 | Wilson ................... G06F 3/0304 |

FOREIGN PATENT DOCUMENTS

| JP | 2006-285715 A | 10/2006 |
| JP | 2017-004117 A | 1/2017 |

\* cited by examiner

*Primary Examiner* — Jennifer T Nguyen
(74) *Attorney, Agent, or Firm* — Cowan, Liebowitz & Latman, P.C.

(57) ABSTRACT

An optical apparatus includes an estimating unit configured to estimate a gaze point position of a user from an image signal of an eyeball of the user, a display unit configured to display a marker indicating the gaze point position estimated by the estimating unit, and a correcting unit configured to correct a position of the marker displayed on the display unit based on at least one of position history of the gaze point position and rotation angle history of the eyeball.

14 Claims, 8 Drawing Sheets

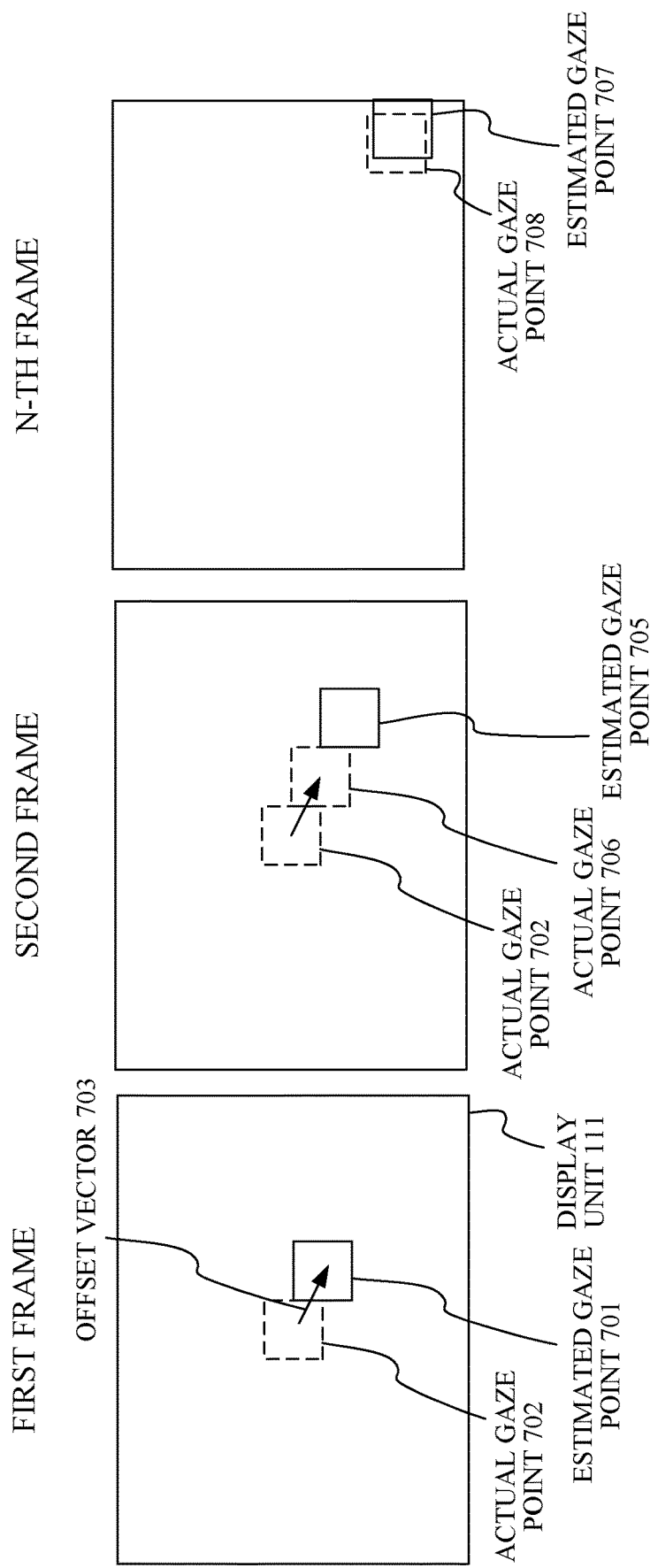

OPTICAL APPARATUS, IMAGE PICKUP APPARATUS, CONTROL METHOD OF OPTICAL APPARATUS, AND STORAGE MEDIUM

BACKGROUND

Technical Field

One of the aspects of the disclosure relates to an optical apparatus, an image pickup apparatus, an optical apparatus controlling method, and a storage medium.

Description of the Related Art

There has conventionally been known a method for detecting and correcting an offset (or gap) between an estimated gaze point position and an actual gaze point position. Japanese Patent Laid-Open No. ("JP") 2017-004117 discloses a method for calculating, in a case where a driver is looking at a specific direction (such as a point at infinity in a front direction), a representative value in that direction and for calculating the offset based on the detected gaze point. JP 2006-285715 discloses a method for assuming, in a case where an event such as a user pressing a button occurs, that the user is looking at the center of the button, and for reflecting an offset between a position of a visual line pointer and the center position of the button on a correction value.

The method disclosed in JP 2017-004117 depends on the conditions such as the scenery seen by the user and the environment of the user, and thus may not be able to properly correct the gaze point position. The method disclosed in JP 2006-285715 requires the user to explicitly indicate the gaze point position by pressing the button or the like, and thus burdens the user.

SUMMARY

One of the aspects of the disclosure provides an optical apparatus that can properly and less arduously correct a gaze point position of a user.

An optical apparatus according to one aspect of the disclosure includes a display unit, and at least one processor, and a memory coupled to the at least one processor, the memory having instructions that, when executed by the processor, perform operations as an estimating unit configured to estimate a gaze point position of a user from an image signal of an eyeball of the user, wherein the display unit is configured to display a marker indicating the gaze point position estimated by the estimating unit, and a correcting unit configured to correct a position of the marker displayed on the display unit based on at least one of position history of the gaze point position and rotation angle history of the eyeball. An image pickup apparatus having the above optical apparatus, a control method corresponding to the above optical apparatus, and a storage medium storing a program that causes a computer to execute the above control method also constitute another aspect of the disclosure.

A control apparatus according to another aspect of the disclosure includes at least one processor, and a memory coupled to the at least one processor, the memory having instructions that, when executed by the processor, perform operations as a detecting unit configured to detect a shift between an actual gaze point position of a user and a position of a marker indicating the gaze point position of the user estimated by an image pickup apparatus, which are displayed on a display unit of the image pickup apparatus, based on at least one of position history of the estimated gaze point position and rotation angle history of an eyeball of the user, and a correcting unit configured to correct the position of the marker so as to reduce the shift detected by the detecting unit.

Further features of the disclosure will become apparent from the following description of exemplary embodiments with reference to the attached drawings.

BRIEF DESCRIPTION OF THE DRAWINGS

FIGS. 7A to 7C illustrate an offset between an actual gaze point and an estimated gaze point in this embodiment.

DESCRIPTION OF THE EMBODIMENTS

Referring now to the accompanying drawings, a detailed description will be given of embodiments according to the disclosure. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
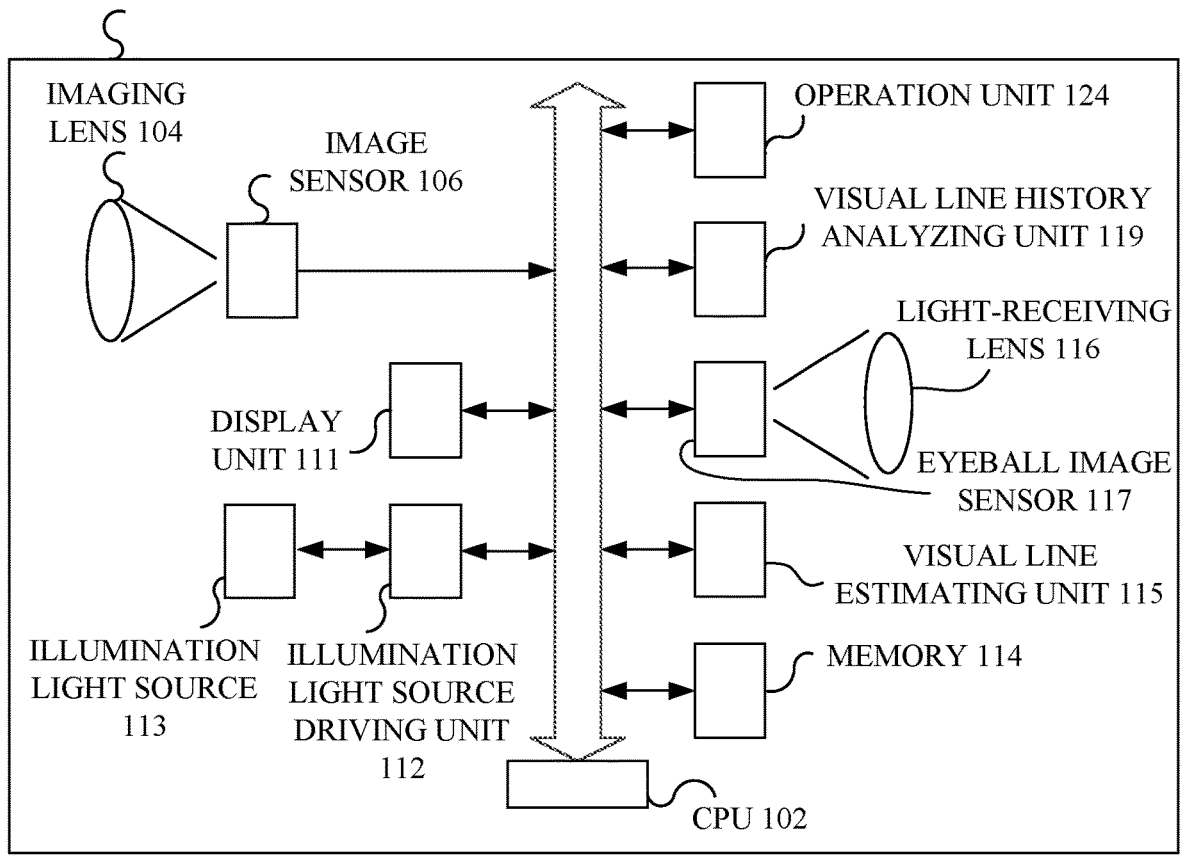
FIG. 1 is a block diagram of an image pickup apparatus according to this embodiment.

Referring now to FIG. 1, a description will be given of a configuration of an optical apparatus according to this embodiment. FIG. 1 is a block diagram of an image pickup apparatus (optical apparatus) 100 according to this embodiment. An imaging lens (imaging optical system) 104 forms an optical image (object image). An image sensor 106 is a photoelectric conversion element such as a CMOS sensor, photoelectrically converts the optical image formed by the imaging lens 104 and outputs an image signal. In this embodiment, the image pickup apparatus 100 is integrated with the imaging lens 104, but the disclosure is not limited to this example. The imaging lens 104 may be a lens apparatus (interchangeable lens) attachable to and detachable from the image pickup apparatus 100.

A CPU 102 controls a display unit 111, an illumination light source driving unit 112, a memory (storage unit) 114, a visual line estimating unit (estimating unit) 115, an eyeball image sensor 117, a visual line history analyzing unit (correcting unit) 119, and an operation unit 124. The display unit 111 displays a captured image and information (marker or index) indicating a gaze point position detected (estimated) by the visual line estimating unit 115. An illumination light source 113 is a light source such as a light-emitting diode that emits insensitive infrared light to a user, is driven by the illumination light source driving unit 112, and illuminates the eyeball of the user. Part of the illumination light reflected by the eyeball of the users is condensed on the eyeball image sensor 117. The memory 114 stores an image signal from the image sensor 106, an image signal from the eyeball image sensor 117, the gaze point position estimated by the visual line estimating unit 115, and visual line correction data for correcting individual differences in visual lines.

The visual line estimating unit 115 is a digital serial interface circuit, and transmits to the CPU 102 an output signal from the eyeball image sensor 117 (a signal acquired by forming an image of the eyeball (eyeball image)). The visual line estimating unit 115 may be part of functions of the CPU 102. A light-receiving lens 116 optically forms the eyeball image of the user on the eyeball image sensor 117. The visual line history analyzing unit 119 analyzes the history of the gaze point position of the user estimated by the visual line estimating unit 115, and detects a characteristic motion (predetermined motion) of the gaze point position (or determines whether or not the gaze point position shows the predetermined motion). The operation unit 124 is a unit for accepting an operation performed by the user for the image pickup apparatus 100 and includes, for example, an unillustrated button and zoom lever attached to the image pickup apparatus 100, and a ring attached to the imaging lens 104.

Figure 3:
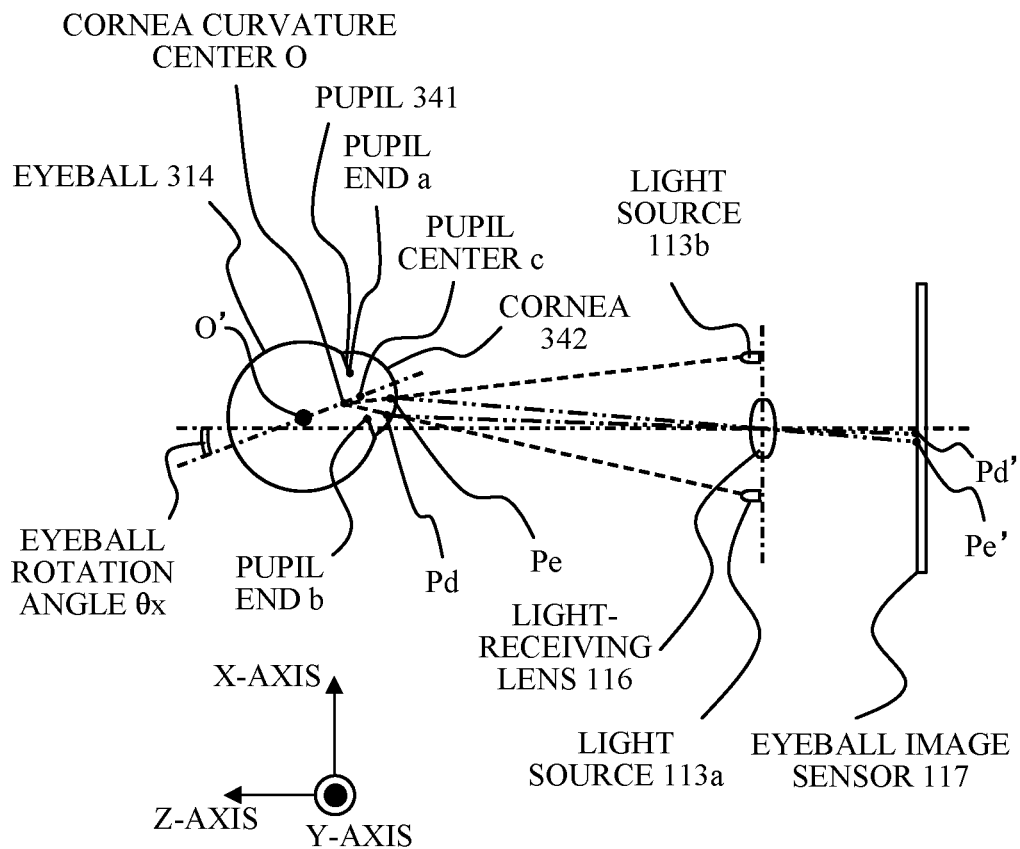
FIG. 3 explains the principle of visual line detection according to this embodiment.
Figure 4:
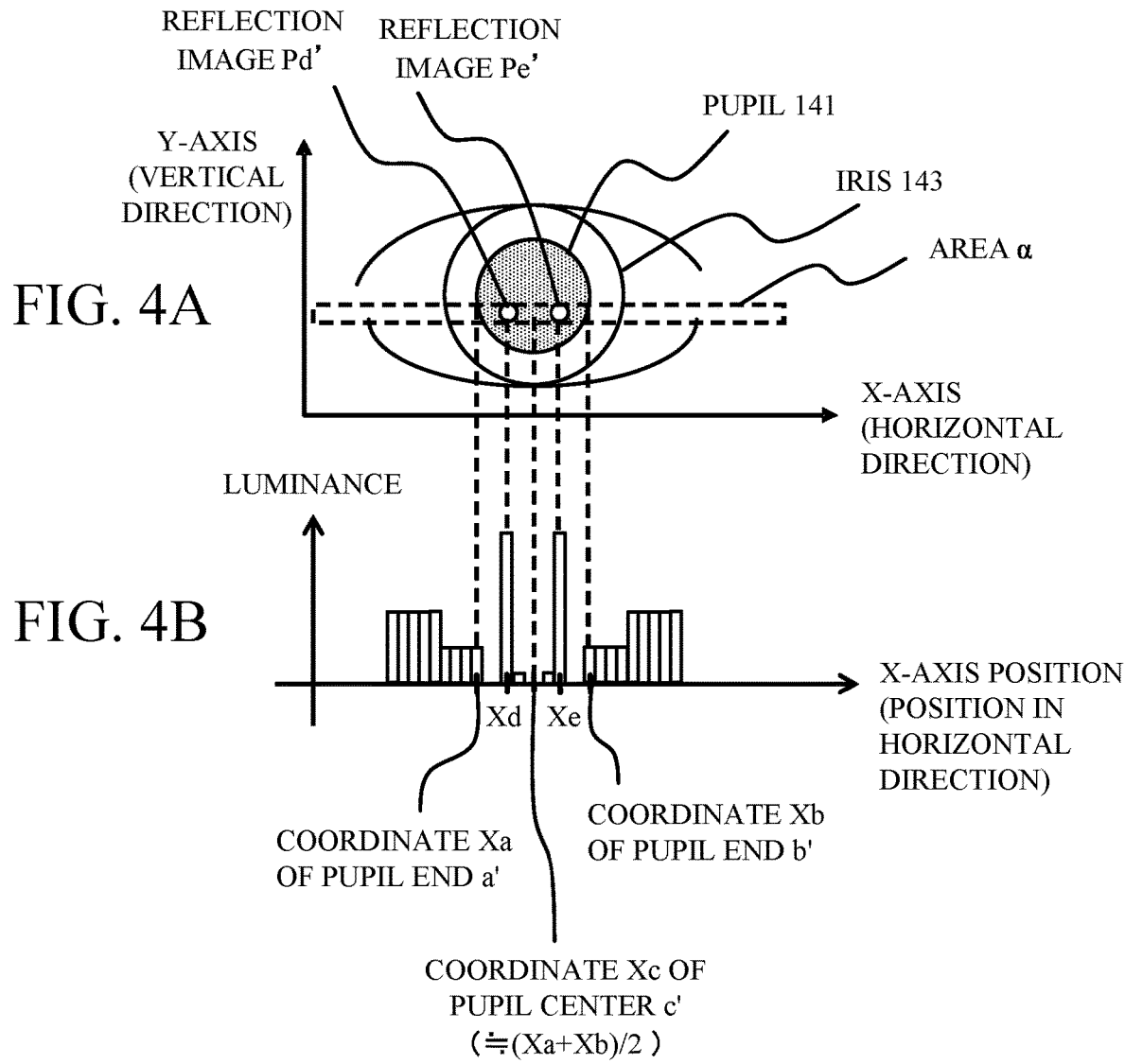
FIGS. 4A and 4B explain an eyeball image projected onto an eyeball image sensor and the output intensity from the eyeball image sensor according to this embodiment.
Figure 5:
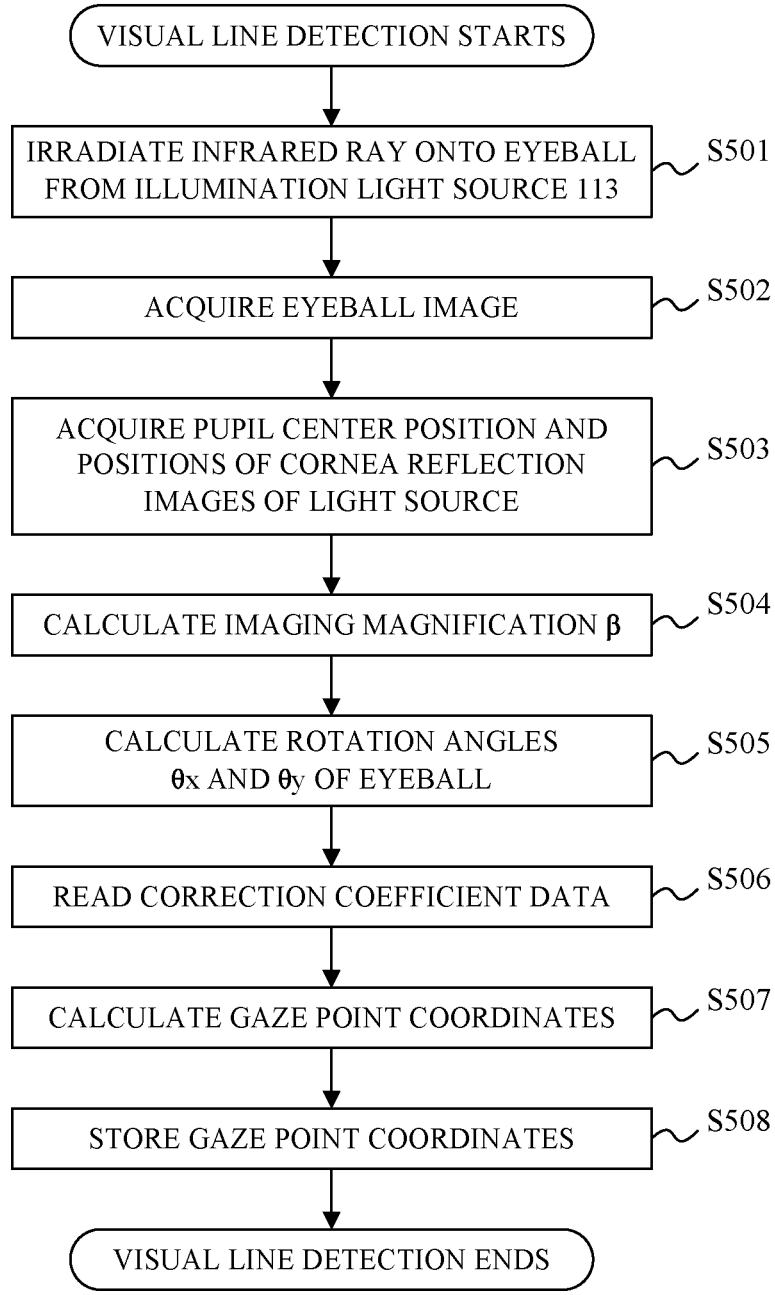
FIG. 5 is a flowchart illustrating visual line detecting processing according to this embodiment.

Referring now to FIGS. 3 to 5, a description will be given of visual line detecting processing of the user. FIG. 3 explains the principle of visual line detection. In FIG. 3, light sources 113a and 113b (illumination light source 113) are light sources such as light-emitting diodes that emit infrared light that is insensitive to the user. The light sources 113a and 113b illuminate the eyeballs of the user. Part of the illumination light reflected by the eyeball of the user is condensed on the eyeball image sensor 117 by the light-receiving lens 116.

FIG. 4A explains an eyeball image projected onto the eyeball image sensor 117. FIG. 4B explains the output intensity from the CCD of the eyeball image sensor 117.

Figure 6A:
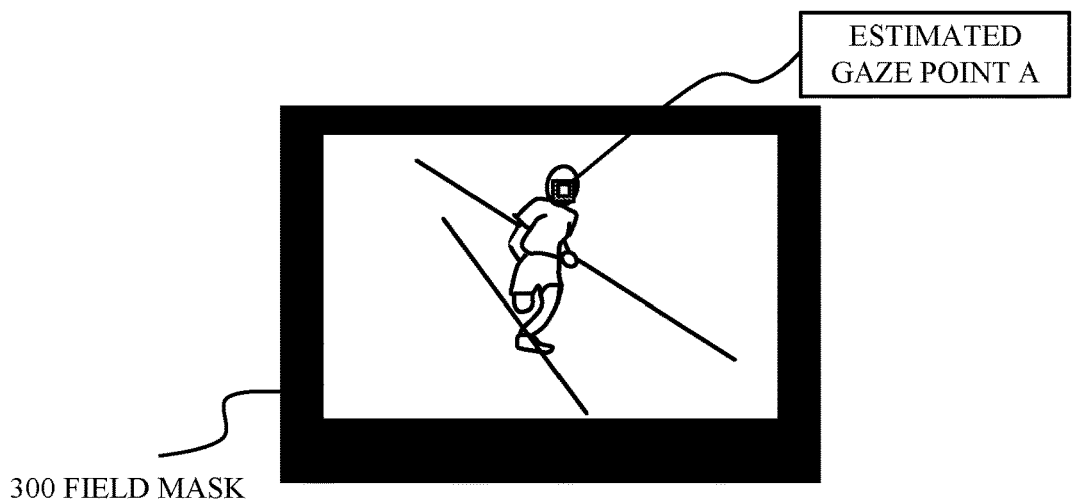
FIGS. 6A to 6C explain a screen viewed by a user through a display unit according to this embodiment.
Figure 6B:
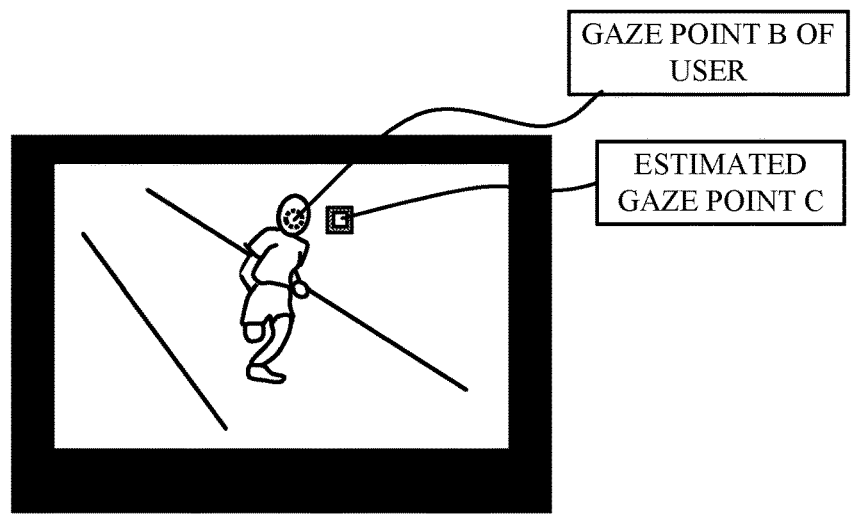
Figure 6C:
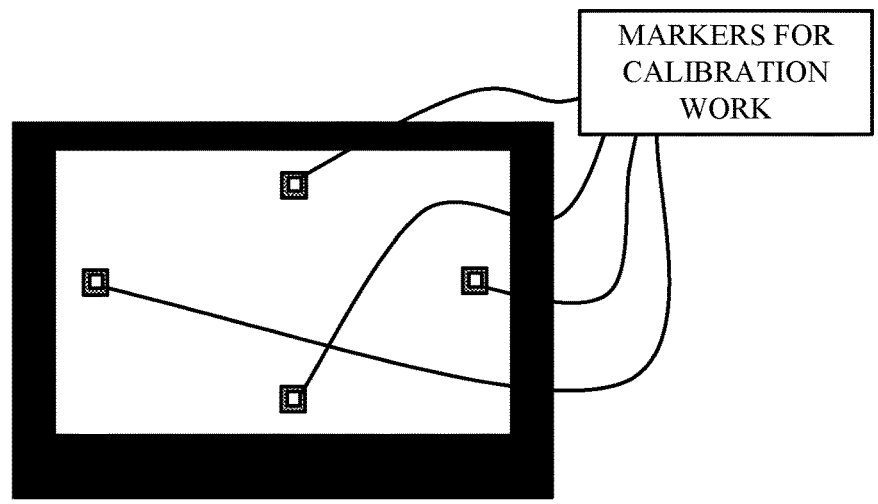

FIG. 5 is a flowchart illustrating the visual line detecting processing. FIGS. 6A to 6C explain screens viewed by the user through the display unit 111. In FIG. 6A, reference numeral 300 denotes a field-of-view mask (or a field mask). The gaze point estimated (calculated) by the visual line estimating unit 115 is displayed on the display unit 111 by making a frame appear as the estimated gaze point A in FIG. 6A.

In FIG. 5, when the visual line detecting processing (visual line detection routine) starts, first in step S501, the illumination light source 113 (light sources 113a and 113b) emits infrared light to the eyeball 314 of the user. An eyeball image of the user illuminated by infrared light is formed on the eyeball image sensor 117 through the light-receiving lens 116. The eyeball image sensor 117 photoelectrically converts the eyeball image formed by the light-receiving lens 116 and outputs an electric signal (image signal). Next, in step S502, the CPU 102 acquires the image signal (eyeball image signal) from the eyeball image sensor 117.

Next, in step S503, based on the eyeball image signal acquired in step S502, the CPU 102 acquires coordinates of cornea reflection images Pd and Pe of the light sources 113a and 113b and a point corresponding to the pupil center c illustrated in FIG. 3 (pupil center position and cornea reflection positions of the light source). The infrared light emitted from the light sources 113a and 113b illuminates a cornea 342 of the eyeball 314 of the user. At this time, the cornea reflection images Pd and Pe formed by part of the infrared light reflected on the surface of the cornea 342 are condensed by the light-receiving lens 116 and formed on the eyeball image sensor 117 (reflection images Pd' and Pe'). Similarly, the light beams (luminous flux) from ends (pupil ends a and b) of the pupil 341 also form an image on the eyeball image sensor 117.

FIG. 4A illustrates an image example of reflection images obtained from the eyeball image sensor 117, and FIG. 4B illustrates a luminance information example obtained from the eyeball image sensor 117 in an area a of the image example in FIG. 4A. In FIG. 4A, a horizontal direction is an X-axis and a vertical direction is a Y-axis. Now assume that Xd and Xe are coordinates in the X-axis direction (horizontal direction) of the reflection images Pd' and Pe' formed by the cornea reflection images Pd and Pe of the light sources 113a and 113b, respectively. Xa and Xb are coordinates in the X-axis direction of the images (pupil ends a' and b') formed by the light beams from the pupil ends a and b of the pupil 314b.

In the luminance information example illustrated in FIG. 4B, extremely high luminance are obtained at the coordinates Xd and Xe corresponding to the reflection images Pd' and Pe' formed by the cornea reflection images Pd and Pe of the light sources 113a and 113b. An area between coordinates Xa (coordinate of the pupil end a') and Xb (coordinate of the pupil end b'), which corresponds to the area of the pupil 341, has an extremely low luminance except for those at the positions Xd and Xe. On the other hand, in an area having a value of an X-coordinate lower than that of the coordinate Xa and an area having a value of an X-coordinate higher than that of the coordinate Xb, corresponding to an area of an iris 343 outside the pupil 341, an intermediate value of the above two types of luminance levels is obtained. From variation information about the luminance level against the X-coordinate position, the X-coordinates Xd and Xe of the reflection images Pd' and Pe' formed by the cornea reflection images Pd and Pe of the light sources 113a and 113b, and the coordinates Xa and Xb of the pupil ends a' and b' can be obtained.

In a case where a rotation angle θx of the optical axis of the eyeball 314 relative to the optical axis of the light-receiving lens 116 is small, a coordinate Xc of the point corresponding to the pupil center c (pupil center c') formed on the eyeball image sensor 117 can be expressed as Xc≈(Xa+Xb)/2. Hence, it is possible to estimate the X coordinate of the pupil center c' formed on the eyeball image sensor 117 and the coordinates of the cornea reflection images Pd' and Pe' of the light sources 113a and 113b.

Next, in step S504 of FIG. 5, the CPU 102 calculates an imaging magnification β of the eyeball image. The imaging magnification β is a magnification determined by the position of the eyeball 314 relative to the light-receiving lens 116, and can be obtained substantially as a function of a distance (interval) (Xd-Xe) between the reflection images Pd' and Pe'. Next, in step S505, the CPU 102 calculates eyeball rotation angles (eyeball angles) θx and θy. The X coordinate of the midpoint of the cornea reflection images Pd and Pe substantially coincides with the X coordinate of the center of curvature O of the cornea 342. Therefore, the rotation angle θx of the optical axis of the eyeball 314 in the Z-X plane can be calculated by the following equation (1):

$$\beta * Oc * \text{SIN } \theta x \approx \{(Xd+Xe)/2\} - Xc \quad (1)$$

where Oc is a standard distance between the center of curvature O of the cornea 342 and the center c of the pupil 341.

FIGS. 5 and 6A to 6C illustrate an example of calculating the rotation angle θx in a case where the eyeball of the user rotates in a plane orthogonal to the Y-axis, but this principle can be applied to the method of calculating the rotation angle θy in a case where the eyeball of the user rotates within a plane orthogonal to the X-axis.

In a case where the rotation angles θx and θy of the optical axis of the eyeball 34 of the user are calculated in step S505, the CPU 102 reads correction coefficient data in step S506. Next, in step S507, the CPU 102 obtains a position of a visual line of the user (a position of a gaze point, referred to as a gaze point position) on the display unit 111 using the rotation angles θx and θy. The gaze point position is calculated as coordinates (Hx, Hy) corresponding to the center c of the pupil 341 on the display unit 111 using the following equations (2) and (3):

$$Hx = m \times (Ax \times \theta x + Bx) \quad (2)$$

$$Hy = m \times (Ay \times \theta y + By) \quad (3)$$

In equations (2) and (3), a coefficient m is a constant representing a relationship between the rotation angles θx and θy of the eyeball of the user and the position on the display unit 111. That is, the coefficient m is a conversion coefficient for converting the rotation angles θx and θy into position coordinates corresponding to the center c of the pupil 141 on the display unit 111, and is previously determined and stored in the memory 114. In equations (2) and (3), Ax, Bx, Ay, and By are visual line correction coefficients (correction coefficient data) for correcting individual differences in visual lines among users, acquired by calibration work to be described below, and stored in the memory 114 before the visual line detection routine starts.

After the coordinates (Hx, Hy) of the center c of the pupil 141 on the display unit 111 are calculated, the CPU 102 stores the gaze point position (gaze point coordinates) calculated in step S507 in the memory 114 in step S508, and ends the visual line detection routine.

The method according to this embodiment acquires the gaze point coordinates on the lens element using the cornea reflection images of the light sources 113a and 113b, but this embodiment is not limited to this example. Any other method may be used as long as it is a method for acquiring the rotation angle of the eyeball from the captured eyeball image.

The calibration work will now be described. The calibration is (advance preparation) processing of correcting an offset between the actual gaze point position (actual gaze point) of the user and the gaze point position of the user estimated by the image pickup apparatus (estimated gaze point). In this embodiment, the CPU 102 functions as an acquiring unit configured to acquire calibration data relating to an offset between the marker displayed on the display unit 111 and the gaze point position estimated by the visual line estimating unit 115.

As described above, this embodiment acquires the eyeball rotation angles θx and θy from the eyeball image in the visual line detecting routine, and estimates the gaze point position through a calculation that converts the coordinates of the pupil center position into the corresponding position on the display unit 111. However, it is necessary to adjust the values of the visual line correction coefficients Ax, Ay, Bx, to proper values for the user due to factors such as individual differences in the human eyeball shape. If such adjustment is not performed, as illustrated in FIG. 6B, the position of the actual gaze position of the user (the position of the gaze point B of the user) shifts from the estimated (calculated) position of the gaze point position C. For example, in the example of FIG. 6B, the user wants to gaze at a person (object) located at the gaze point B, but the visual line estimating unit 115 incorrectly estimates that the user is gazing at the background. Therefore, before the image pickup apparatus 100 is used, it is necessary to perform the calibration work, to obtain proper correction coefficient values for each user, and to store them in the memory 114.

Conventionally, before the image pickup apparatus 100 is used, the calibration work has been performed by highlighting a plurality of indices at different positions and by requesting the user to look at the indices, as illustrated in FIG. 6C. The well-known technology is work to perform gaze point detecting processing in gazing each marker, and to calculate a proper correction coefficient (calibration data) from the calculated estimated gaze point coordinates and the position of each marker coordinate.

Figure 2:
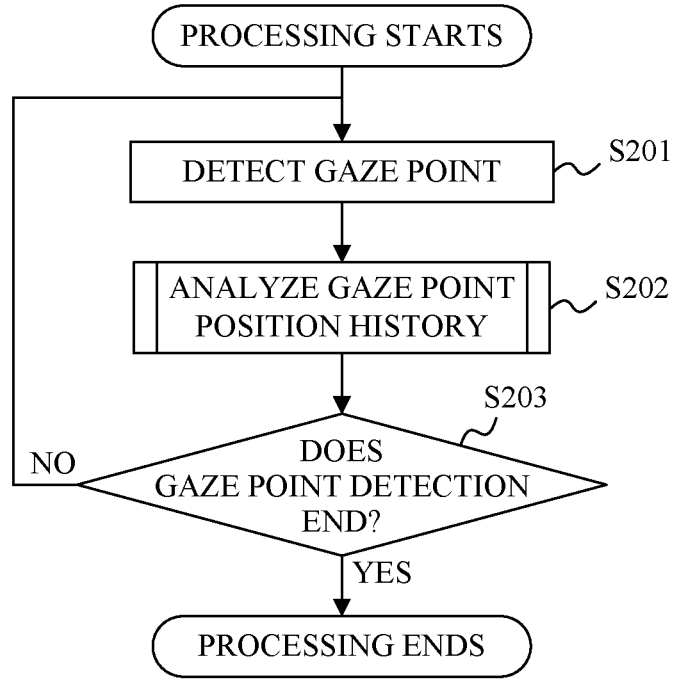
FIG. 2 is a flowchart illustrating gaze point detecting processing according to this embodiment.

Even if the offset between the actual gaze position (actual gaze point) and the estimated gaze point estimated by the visual line estimating unit 115 is corrected using the correction coefficient obtained in the calibration work, the offset may remain. This problem may occur in a case where a positional relationship between the user and the light-receiving lens 116 significantly changes between the calibration work time and the imaging time. Referring now to FIG. 2, a description will be given of an offset detecting method and an offset correcting method (gaze point detecting processing). FIG. 2 is a flowchart illustrating gaze point detecting processing.

First, in step S201, the CPU 102 detects a gaze point (gaze point position) by the visual line detecting processing described with reference to FIG. 5. Next, in step S202, the CPU 102 (visual line history analyzing unit 119) analyzes the history of the gaze point position detected in step S201 (position history).

Figure 8:
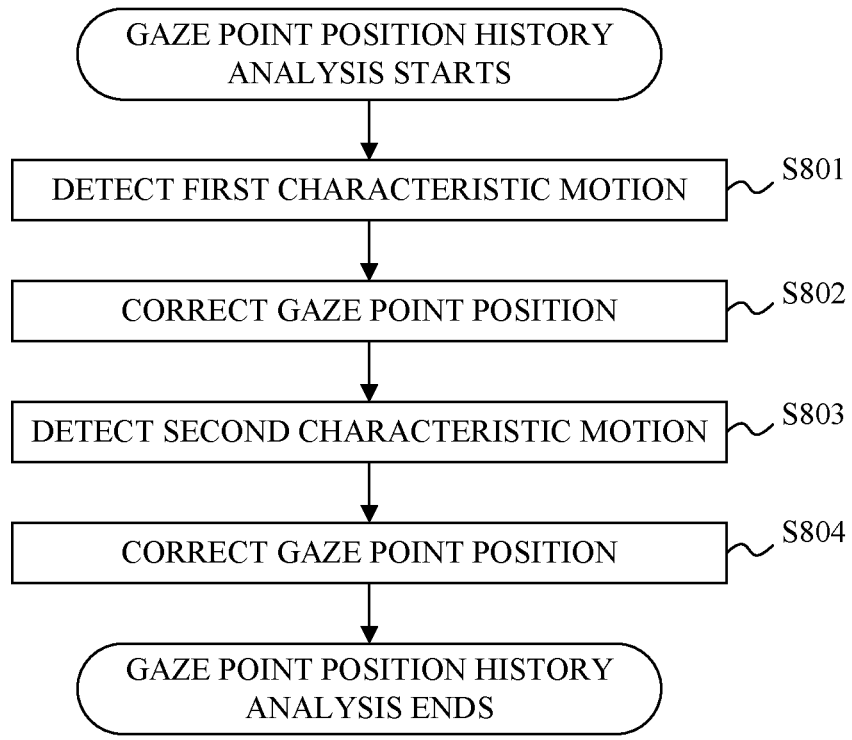
FIG. 8 is a flowchart of analyzing processing of gaze point position history according to this embodiment.

Referring now to FIG. 8, a description will be given of analyzing processing of the gaze point position history. FIG. 8 is a flowchart of the analyzing processing of the gaze point position history. First, in step S801, the CPU 102 (visual line history analyzing unit 119) detects that the gaze point position continues to deviate in a predetermined direction showing a first characteristic motion of the gaze point (the gaze point position continues to deviate in the predetermined direction within a predetermined time).

FIGS. 7A to 7C illustrate an offset between the actual gaze point and the estimated gaze point. FIG. 7A illustrates a gaze point frame at an estimated gaze point 701 on the display unit 111. FIG. 7A illustrates an offset (offset vector 703) between an actual gaze point 702 as a point that the user is actually looking at and the estimated gaze point 701.

In this state, the user is highly likely to look at the estimated gaze point 701 where the gaze point frame is displayed, and when the user looks at the gaze point frame, the actual gaze point 706 moves to the position where the frame of the gaze point 701 is displayed in the next frame as illustrated in FIG. 7B. Then, the estimated gaze point 701 also moves to an estimated gaze point 705 from the actual gaze point 706 by the offset vector 703. If this process is repeated for each frame, as illustrated in FIG. 7C, an actual gaze point 708 of the user moves in the direction of the offset vector 703 and finally moves to the end of the display unit 111.

Figure 9A:
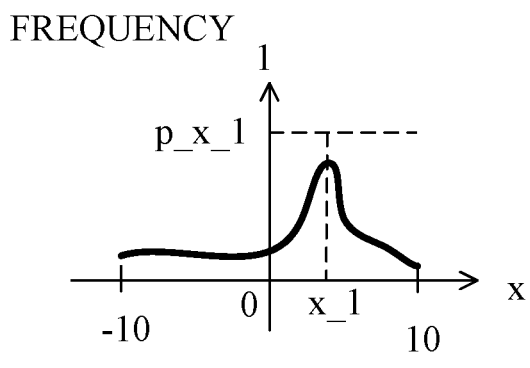
FIGS. 9A and 9B illustrate motion distributions of the estimated gaze point according to this embodiment.
Figure 9B:
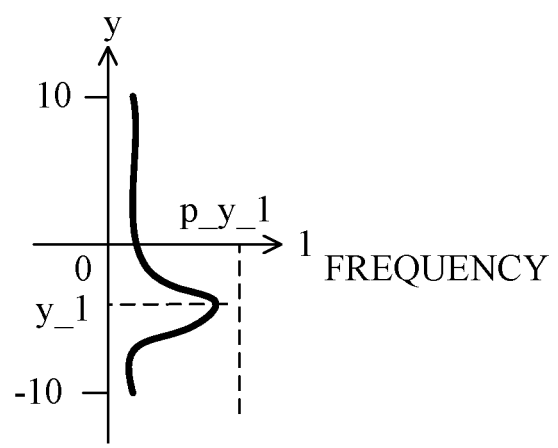

In order to detect such a state, a moving amount in a horizontal direction (x-direction) and a moving amount in a vertical direction (y-direction) of the estimated gaze point between frames is observed for a predetermined time period (predetermined period), and a histogram for each direction is created as illustrated in FIGS. 9A and 9B. FIGS. 9A and 9B illustrate distributions (histograms) of the motions of the estimated gaze point. In FIG. 9A, the horizontal axis represents the moving amount in the horizontal direction (x-direction) of the estimated gaze point on the display unit 111 between frames, and the vertical axis represents a normalized value such that a total of the observation number (frequency) in the predetermined period can be 1. Similarly, in FIG. 9B, the vertical axis represents the moving amount in the vertical direction (y-direction) of the estimated gaze point on the display unit 111 between frames, and the horizontal axis represents a normalized value such that a total of the observation number (frequency) in the predetermined period can be 1.

The CPU 102 analyzes the histograms illustrated in FIGS. 9A and 9B, makes larger a (characteristic) evaluation value f as a mode p_x_1 of the moving amount in the horizontal direction is closer to 1 and as a mode p_y_1 of the moving amount in the vertical direction is closer to 1. For example, the evaluation value f is calculated using the following equation (4). In equation (4), k_x and k_y are weighted addition coefficients.

$$f = k\_x \cdot p\_x\_1 + k\_y \cdot p\_y\_1 \quad (4)$$

The larger the evaluation value f is, the more characteristic the motion shows. At that time, the CPU 102 (visual line history analyzing unit 119) determines that there is an offset between the actual gaze point and the estimated gaze point, which corresponds to the offset vector 703 having a horizontal component x_1 and a vertical component y_1.

Next, in step S802 of FIG. 8, the CPU 102 (visual line history analyzing unit 119) corrects the offset of the gaze point position based on the evaluation value f calculated in step S801 and the detected offset vector 703 (x_1, y_1). This embodiment assigns a symbol diff to the offset vector 703 for explanation purposes. By adding to the estimated gaze point a value made by multiplying the offset vector $v_{diff}$ by an offset correction intensity α(f) expressed by the following equation (5), the offset between the actual gaze point and the estimated gaze point can be corrected.

$$\alpha(f) = \begin{cases} k \cdot f \, (0 \le k \cdot f \le 1) & \text{if } |v_{diff}| > th_{diff} \\ 1 & \text{else} \end{cases} \quad (5)$$

The correction intensity α(f) is a function of the evaluation value f, and the correction strength α becomes larger as the evaluation value f becomes larger. In a case where the offset vector $v_{diff}$ is corrected in a short time period, the user may feel uncomfortable because the gaze point marker displayed at the estimated gaze point marker on the display unit 111 may suddenly move. Therefore, in a case where a magnitude of the offset vector $v_{diff}$ is larger than a threshold $th_{diff}$, the estimated gaze point position is corrected by a value made by multiplying the offset vector $v_{diff}$ by a (correction) coefficient k and the evaluation value f, where a value made by multiplying the coefficient k and the evaluation value f is set to be 0 or more and 1 or less. In a case where the magnitude of the offset vector $v_{diff}$ becomes smaller than the threshold $th_{diff}$, the estimated gaze point position is corrected by the magnitude of the offset vector $v_{diff}$.

Thus, in this embodiment, the visual line history analyzing unit 119 makes larger the (characteristic) evaluation value f about the predetermined motion as the reciprocation frequency of the gaze point position between two different positions within the predetermined time becomes higher. In a case where the visual line history analyzing unit 119 determines that the gaze point position shows the predetermined motion, the visual line history analyzing unit 119 corrects the gaze point position using a correction vector made by multiplying the moving velocity vector (offset vector $v_{diff}$) of the gaze point position by the correction coefficient (coefficient k) that is based on the evaluation value. The gaze point position can be corrected in a case where a characteristic motion is detected, but this embodiment is not limited to this example. Alternatively, the correction coefficient stored in the memory 114 may be corrected (updated) based on the detected offset.

Figure 10:
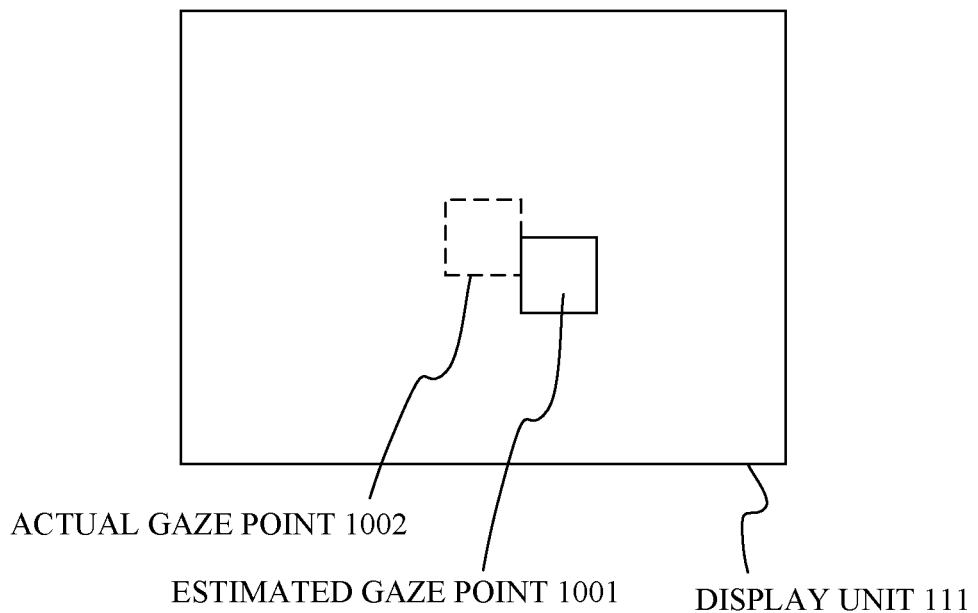
FIG. 10 illustrates an offset between an actual gaze point and an estimated gaze point according to this embodiment.

Next, in step S803, the CPU 102 (visual line history analyzing unit 119) determines whether the gaze point position reciprocates (alternately moves) between two locations showing a second characteristic motion of the gaze point (whether the gaze point position moves within a predetermined time). Referring now to FIG. 10, a description will be given of this case. FIG. 10 illustrates an offset between an actual gaze point 1002 and an estimated gaze point 1001. As illustrated in FIG. 10, there is an offset between the actual gaze point 1002 and the estimated gaze point 1001, but if the user is also aware of this offset, the user periodically looks at the estimated gaze point 1001 while gazing at the actual gaze point 1002. Thus, the second characteristic motion may occur in a case where the user confirms a gaze point frame displayed at the estimated gaze point 1001.

Figure 11:
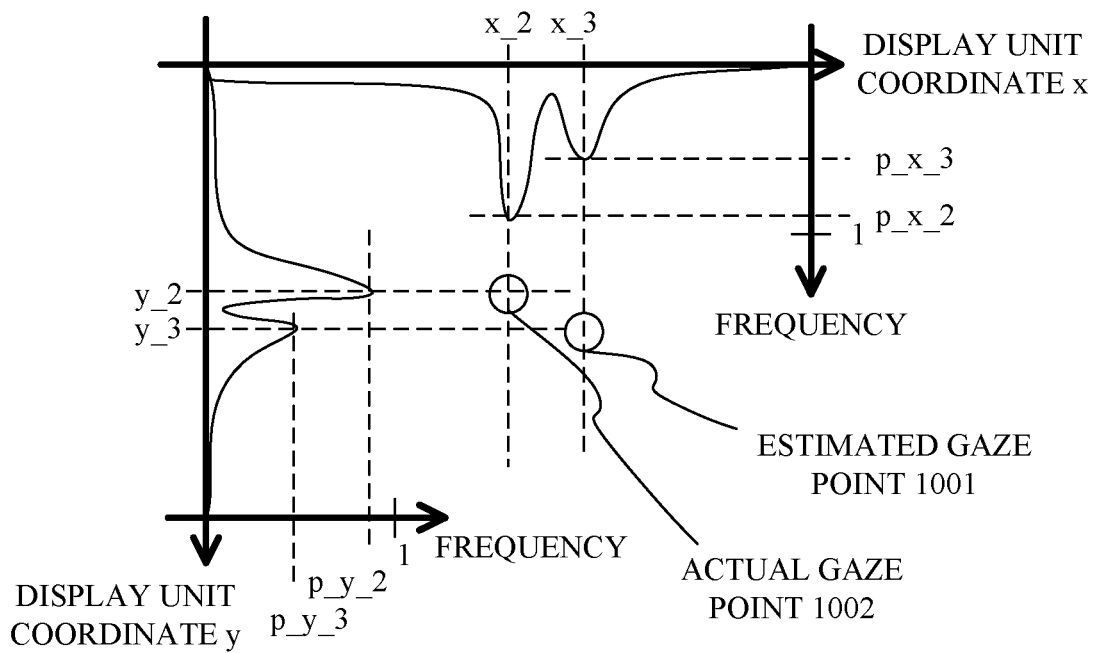
FIG. 11 illustrates distributions of estimated gaze points according to this embodiment.

In order to detect such a state, a horizontal position (x) and a vertical position (y) of the estimated gaze point between frames are observed for a predetermined time period, and a histogram for each direction is created as illustrated in FIG. 11. FIG. 11 illustrates distributions (histograms) of the estimated gaze point. In FIG. 11, in the horizontal direction, the horizontal axis represents the horizontal position (x) of the estimated gaze point on the display unit 111, and the vertical axis represents a normalized value such that a total of the observation number (frequency) in a predetermined period can be 1. Similarly, in the vertical direction, the vertical axis represents the vertical position (y) of the estimated gaze point on the display unit 111, and the horizontal axis represents a normalized value such that a total of the observation number (frequency) in the predetermined period f can be 1.

The CPU 102 (visual line history analyzing unit 119) determines that a horizontal position having the highest frequency is a horizontal position (x_2) of the actual gaze point, and a vertical position having the highest frequency is a vertical position (y_2) of the actual gaze point. In addition, the CPU 102 determines that a horizontal position having the second highest frequency is a horizontal position (x_3) of the estimated gaze point, and a vertical position having the second highest frequency is a vertical position (y_3) of the estimated gaze point.

The CPU 102 makes larger the evaluation value f as a mode p_x_2 of the horizontal position of the actual gaze point is closer to 1 and as a mode p_y_2 of the vertical position of the actual gaze point is closer to 1. For example, the evaluation value f is calculated using the equation (4). The larger the evaluation value f is, the more characteristic the motion shows. The CPU 102 (visual line history analyzing unit 119) analyzes the histograms, calculates an offset between the horizontal coordinates x_2 and x_3 corresponding to the frequencies p_x_2 and p_x_3 as an offset in the x direction, and an offset between the vertical coordinates y_2 and y_3 corresponding to the frequencies p_y_2 and p_y_3 as an offset in the y direction.

Next, in step S804 of FIG. 8, the CPU 102 (visual line history analyzing unit 119) corrects the offset of the gaze point position based on the evaluation value f calculated in step S804 and the detected offset vector (x_3-x_2, y_3-y_2). This embodiment assigns the symbol $v_{diff}$ to the offset vector for explanation purposes. Since the correction method is similar to that of step S802, a description thereof will be omitted.

Thus, in this embodiment, the visual line history analyzing unit 119 makes larger the characteristic evaluation value f about the predetermined motion as the frequency of the gaze point position reciprocating between two different positions within a predetermined period of time is higher. In a case where the visual line history analyzing unit 119 determines that the gaze point position shows the predetermined motion, the visual line history analyzing unit 119 corrects the gaze point position using a correction vector made by multiplying the vector between two different positions by a correction coefficient that is based on the evaluation value. The gaze point position can be corrected in a case where a characteristic motion is detected, but this embodiment is not limited to this example. Alternatively, the correction coefficient stored in the memory 114 may be further corrected (updated) using the detected offset.

In this embodiment, as illustrated in FIGS. 7A to 7C or FIG. 11, in a case where the estimated gaze point is offset from the actual gaze point in the lower right direction on the display unit 111, the user may actually move the visual line to the lower right and tries to look at an object located at the lower right or a menu display located at the lower right. Therefore, even if the motion of the visual line of the user corresponds to the first characteristic motion (S801) or the second characteristic motion (S803), it is unnecessary to correct the estimated gaze point position in a case where there is a characteristic object at a moved estimated gaze point position, such as a person, an animal, and a high-contrast object. That is, the visual line history analyzing unit 119 may not correct the position of the marker displayed on the display unit 111 in a case where the gaze point position estimated by the visual line estimating unit 115 moves and reaches a predetermined position, and a characteristic object is detected around the predetermined position.

Alternatively, in a case where the operation unit 124 is operated after the estimated gaze point position moves to give some instruction (predetermined operation) to the image pickup apparatus 100 for the gaze point position, the CPU 102 may determine that there was an intention to move the gaze point to that position and may not correct the estimated gaze point position. In other words, the visual line history analyzing unit 119 may not correct the position of the marker displayed on the display unit 111 in a case where the gaze point position estimated by the visual line estimating unit 115 moves and reaches a predetermined position, and the predetermined operation is performed for the image pickup apparatus 100.

Alternatively, in a case where the estimated gaze point position is moving at a velocity higher than a predetermined velocity, the CPU 102 may determine that the user is not following the gaze point frame but is quickly moving the visual line to a characteristic object or menu display and may not correct the estimated gaze point position.

This embodiment has performed the calibration work in advance and stored the correction coefficients in the memory 114. In this embodiment, the visual line history analyzing unit 119 may correct the calibration data based on at least one of position history and the rotation angle history. However, this embodiment is not limited to this example. By detecting the above characteristic motion without performing the calibration work in advance, the offset between the actual gaze point and the estimated gaze point may be detected and corrected during imaging.

This embodiment detects the characteristic motion based on the history of the estimated gaze point position, but may use the history of the rotation angles θx and θy of the eyeball of the user (rotation angle history). The relationship between the gaze point (Hx, Hy) and the rotation angles θx and θy of the eyeball is expressed by equations (2) and (3). The detecting method may conform to steps S801 and S803 in FIG. 8, and thus a description thereof will be omitted.

As described above, the image pickup apparatus 100 according to this embodiment includes the visual line estimating unit 115, the display unit 111, and the visual line history analyzing unit 119. The visual line estimating unit 115 estimates the gaze point position of the user from the image signal of the eyeball of the user. The display unit 111 displays the marker indicating the gaze point position estimated by the visual line estimating unit 115. The visual line history analyzing unit 119 analyzes at least one of the position history of the gaze point position and the rotation angle history of the eyeball. The visual line history analyzing unit 119 corrects the position of the marker displayed on the display unit 111 based on at least one of the position history and the rotation angle history. The visual line history analyzing unit 119 may correct the position of the marker displayed on the display unit 111 in a case where the visual line history analyzing unit 119 determines that the gaze point position shows a predetermined motion based on at least one of position history and rotation angle history.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

This embodiment can provide an optical apparatus, a method for controlling the optical apparatus, and a storage medium, each of which can properly (dynamically) correct a gaze point position of a user without burdening him.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, the disclosure is also applicable to an optical apparatus for virtual reality (VR) and optical see-through MR/AR.

This application claims the benefit of Japanese Patent Application No. 2022-009747, filed on Jan. 25, 2022, which is hereby incorporated by reference herein in its entirety.

What is claimed is:

1. An optical apparatus comprising:
a display unit; and
at least one processor, and a memory coupled to the at least one processor, the memory having instructions that, when executed by the processor, perform operations as:
an estimating unit configured to estimate a gaze point position of a user from an image signal of an eyeball of the user, wherein the display unit is configured to display a marker indicating the gaze point position estimated by the estimating unit; and
a correcting unit configured to correct a position of the marker displayed on the display unit based on at least one of position history of the gaze point position and rotation angle history of the eyeball,
wherein in a case where the correcting unit determines that the gaze point position shows a predetermined motion based on at least one of the position history and the rotation angle history, the correcting unit corrects the position of the marker displayed on the display unit, and
wherein the predetermined motion is at least one of a motion in which the gaze point position moves in a predetermined direction within a predetermined time and a motion in which the gaze point position reciprocates between two different positions within a predetermined time.

2. The optical apparatus according to claim 1, wherein the correcting unit makes larger an evaluation value for the predetermined motion as a motion frequency of the gaze point position becomes higher in a predetermined direction within a predetermined time.

3. The optical apparatus according to claim 2, wherein in a case where the correcting unit determines that the gaze point position shows the predetermined motion, the correcting unit correct the position of the marker using a correction vector made by multiplying a moving velocity vector of the gaze point position by a correction coefficient that is based on the evaluation value.

4. The optical apparatus according to claim 1, wherein the correcting unit makes larger an evaluation value for the predetermined motion as a reciprocating frequency of the gaze point position between two different positions within a predetermined time becomes higher.

5. The optical apparatus according to claim 4, wherein in a case where the correcting unit determines that the gaze point position shows the predetermined motion, the correcting unit corrects the position of the marker using a correction vector made by multiplying a vector between the two different positions by a correction coefficient that is based on the evaluation value.

6. The optical apparatus according to claim 1, further comprising an acquiring unit configured to acquire calibration data about an offset between the marker displayed on the display unit and the gaze point position estimated by the estimating unit,
wherein the correcting unit corrects the calibration data based on at least one of the position history and the rotation angle history.

7. The optical apparatus according to claim 1, wherein in a case where the gaze point position estimated by the estimating unit moves and reaches a predetermined position and a predetermined operation is performed for the optical apparatus, the correcting unit does not correct the position of the marker displayed on the display unit.

8. The optical apparatus according to claim 1, wherein in a case where the gaze point position estimated by the estimating unit moves and reaches a predetermined position, and an object is detected around the predetermined position, the correcting unit does not correct the position of the marker displayed on the display unit.

9. The optical apparatus according to claim 1, further comprising an eyeball image sensor configured to photoelectrically convert an eyeball image formed by a lens.

10. The optical apparatus according to claim 1, wherein the correcting unit corrects the position of the marker during imaging.

11. An image pickup apparatus comprising:
an image sensor configured to photoelectrically convert an object image formed by an imaging optical system; and
the optical apparatus according to claim 1.

12. A method of controlling an optical apparatus, the method comprising the steps of:
estimating a gaze point position of a user from an image signal of an eyeball of the user;
displaying a marker indicating the gaze point position estimated by the estimating step; and
correcting a position of the marker displayed on the display unit based on at least one of position history of the gaze point position and rotation angle history of the eyeball,
wherein in the correcting step, in a case where it is determined that the gaze point position shows a predetermined motion based on at least one of the position history and the rotation angle history, the position of the marker displayed on the display unit is corrected, and wherein the predetermined motion is at least one of a motion in which the gaze point position moves in a predetermined direction within a predetermined time and a motion in which the gaze point position reciprocates between two different positions within a predetermined time.

13. A non-transitory computer-readable storage medium storing a program for causing a computer to execute the control method according to claim 12.

14. A control apparatus comprising at least one processor, and a memory coupled to the at least one processor, the memory having instructions that, when executed by the processor, perform operations as:

a detecting unit configured to detect a shift between an actual gaze point position of a user and a position of a marker indicating the gaze point position of the user estimated by an image pickup apparatus, which are displayed on a display unit of the image pickup apparatus, based on at least one of position history of the estimated gaze point position and rotation angle history of an eyeball of the user; and a correcting unit configured to correct the position of the marker so as to reduce the shift detected by the detecting unit, wherein in a case where the correcting unit determines that the gaze point position shows a predetermined motion based on at least one of the position history and the rotation angle history, the correcting unit corrects the position of the marker displayed on the display unit, and wherein the predetermined motion is at least one of a motion in which the gaze point position moves in a predetermined direction within a predetermined time and a motion in which the Gaze point position reciprocates between two different positions within a predetermined time.

* * * * *